Nov. 29, 1927.
C. JASPERSON
POTATO HARVESTER
Filed Nov. 14, 1924
1,650,753
3 Sheets-Sheet 1
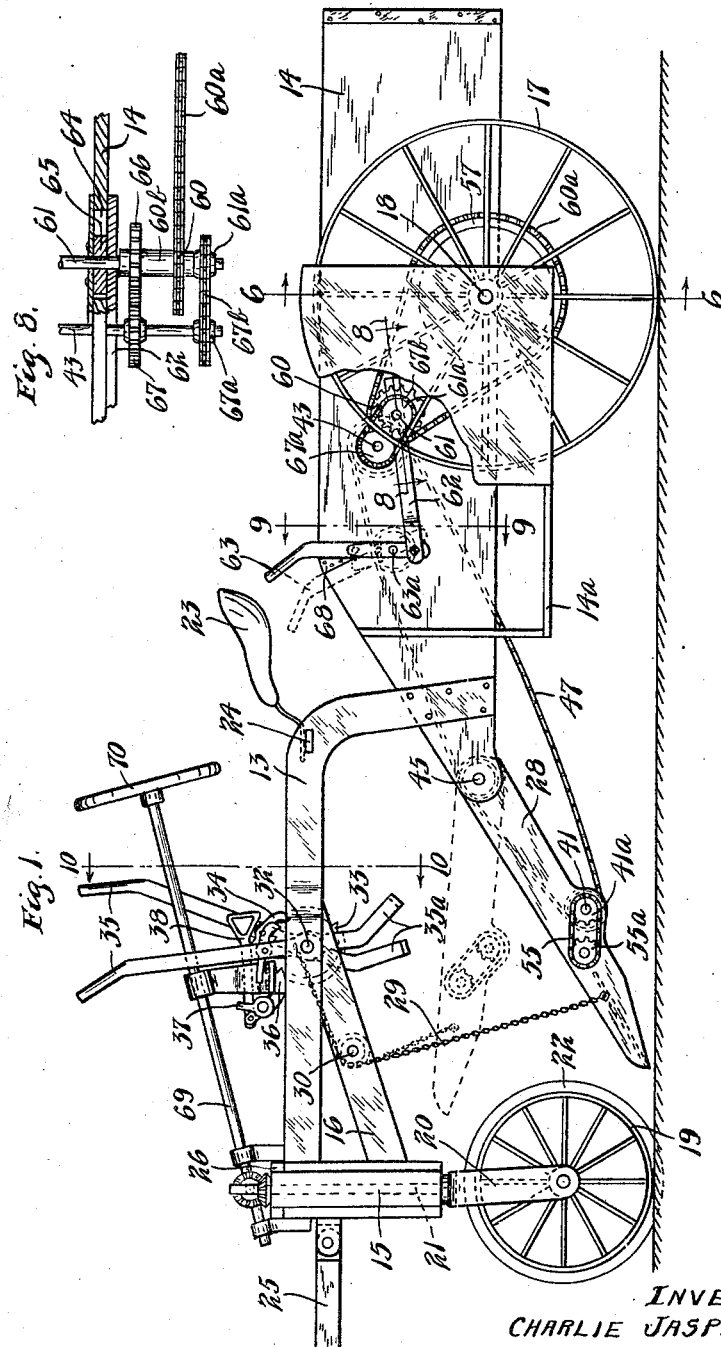
INVENTOR.
CHARLIE JASPERSON.
BY HIS ATTORNEY.
James F. Williams Nov. 29, 1927.  
C. JASPERSON  
1,650,753  
POTATO HARVESTER  
Filed Nov. 14, 1924  
3 Sheets-Sheet 2
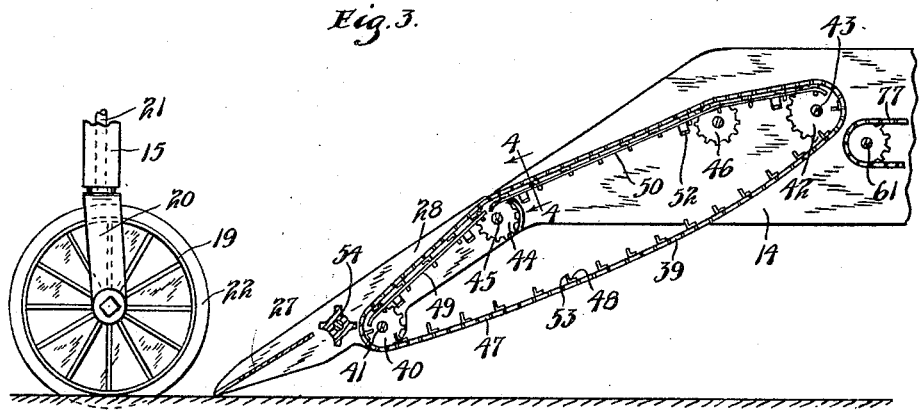
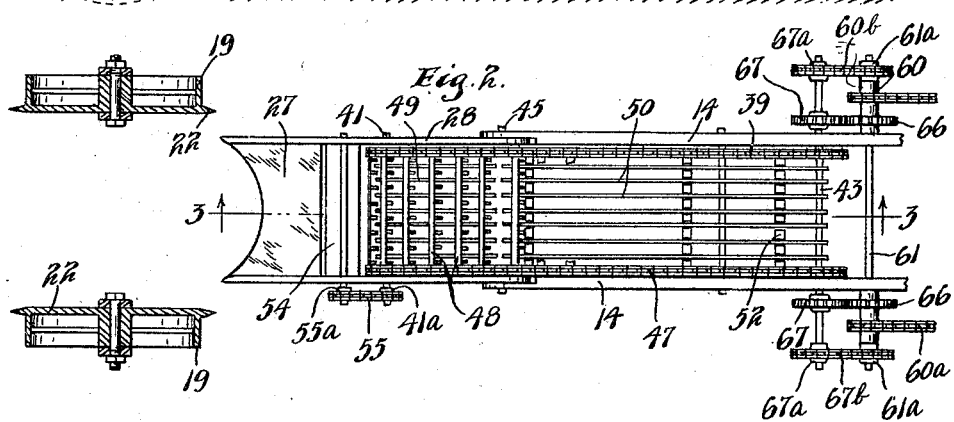
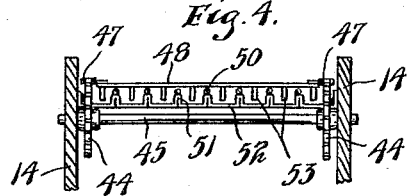
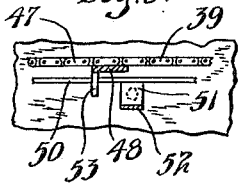
INVENTOR.  
CHARLIE JASPERSON  
BY HIS ATTORNEY.  
James F. Williamson Nov. 29, 1927.
C. JASPERSON
POTATO HARVESTER
Filed Nov. 14, 1924
1,650,753
3 Sheets-Sheet 3
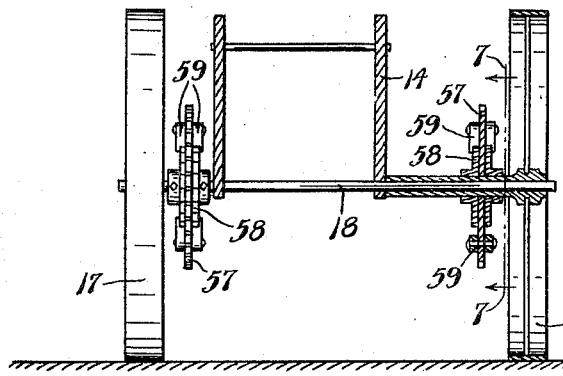
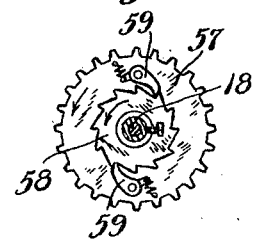
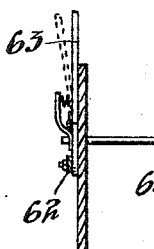
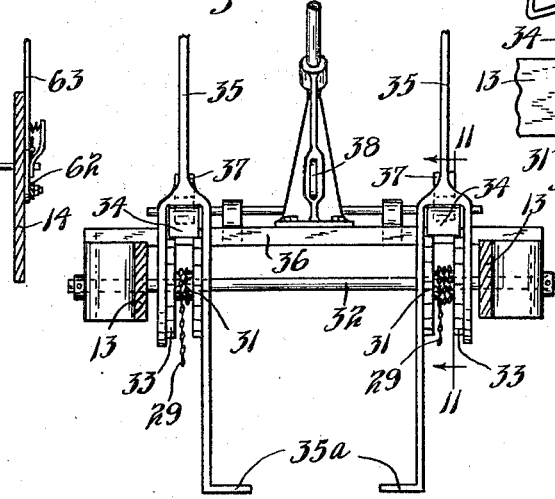
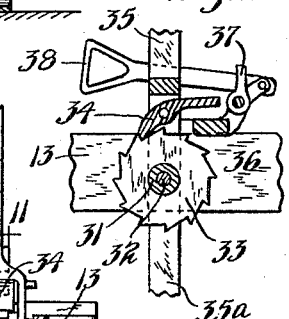
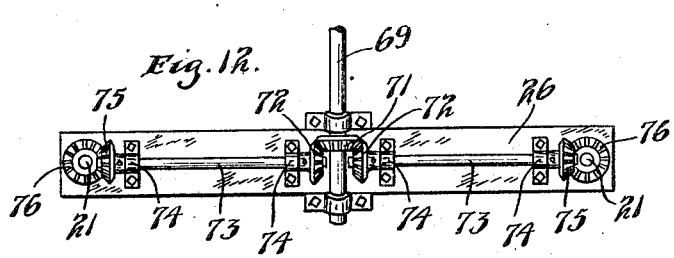
INVENTOR.
CHARLIE JASPERSON.
BY HIS ATTORNEY.

Patented Nov. 29, 1927.

1,650,753

UNITED STATES PATENT OFFICE.

CHARLIE JASPERSON, OF BALDWIN TOWNSHIP, SHERBURNE COUNTY, MINNESOTA.

POTATO HARVESTER.

Application filed November 14, 1924. Serial No. 749,834.

This invention relates to potato harvesters and has for its main object to provide a simple but highly efficient device of this kind which will dig the potatoes from the ground, detach adhering dirt, rocks and vines and sort the potatoes into different sizes and provide means for bagging the sorted potatoes.

An additional object of the invention is to provide an improved means for digging the potatoes from the ground and for preparing the ground for digging in advance of the digger blade.

An additional object is to provide a novel and efficient means for freeing the potatoes from dirt and small rocks by supplying an endless conveyor comprising a pair of spaced endless chains having a plurality of transverse slats thereacross working over and guided on a plurality of spaced rods, each of said slats having a series of depending fingers adapted to extend between and below said rods, thereby keeping the spaces between said rods clear and free from dirt, vines, etc., at all times.

A further object is to provide novel means for varying the angle of the digger blade which is accomplished by securing the blade to a swinging frame pivoted to the main frame of the harvester and controlled by a pair of winches operative from the driver's seat.

A further object is to provide driving means for the conveyor, agitator, sorting and bagging apparatus connected to the rear wheels of the harvester as the source of power, and to supply differential devices on the rear axle to prevent the stripping of gears or twisting of shafts on turns and uneven rotation of the two back wheels.

A still further object in such a device is to provide a simple but efficient transmission device for readily connecting and disconnecting the driving power with the conveyor and agitator.

To these ends, generally stated, the invention consists of the novel devices and combinations of devices herein described and set forth in the claims.

The apparatus for picking, sorting and bagging the potatoes in the harvester is identical with the structure described and set forth in the applicant's pending application for U. S. patent, entitled "Potato picker, cleaner, sorter and bagger" filed December 19, 1923, Serial Number 681,497, and consequently this apparatus has been omitted from the drawings and will not be herein described, although the driving shaft therefor and means of driving are illustrated on the drawings and will be hitherto described.

The preferred form of the invention is illustrated in the accompanying drawings, wherein like characters refer to similar parts throughout the several views, and in which, Fig. 1 is a side elevation of the device with some parts broken away and the moved position of some members indicated by dotted lines;

Fig. 2 is a view of the device mostly in plan but partly in section;

Fig. 3 is an enlarged vertical section with some parts broken away, taken on the line 3—3 of Fig. 2;

Fig. 4 is a vertical cross section taken on the line 4—4 of Fig. 3;

Fig. 5 is an enlarged fragmentary cross sectional view of the conveyor structure;

Fig. 6 is a vertical cross section taken on the line 6—6 of Fig. 1;

Fig. 7 is a vertical section taken on the line 7—7 of Fig. 6;

Fig. 8 is a substantially horizontal section taken on the line 8—8 of Fig. 1;

Fig. 9 is a cross section taken on the line 9—9 of Fig. 1, with the conveyor apparatus detached;

Fig. 10 is an enlarged cross section taken on the line 10—10 of Fig. 1;

Fig. 11 is a vertical section taken on the line 11—11 of Fig. 10; and

Fig. 12 is an enlarged detail plan view showing the steering mechanism.

Referring to the drawings by numerals of reference, a suitable frame is provided, comprising at its forward end the oppositely disposed L-shaped frame bars 13 rigidly secured to the sides of a rectangular-shaped box structure 14, the sides of which constitute the rear portion of the frame. To the forward ends of the frame bars 13, a pair of vertically disposed bolsters 15 are secured, made rigid with said frame bars by means of brace bars 16. The rear of the frame is mounted on wheels 17 carrying axles 18 journaled in the sides of frame 14. The bolsters 15 at the front of the frame are mounted on wheels 19 journaled in forked members 20 having elongated upstanding pintles 21 which are journaled in and extend through bolsters 15. The wheels 19 are provided with vertical cutting disks 22 on their inner sides having sharp circular cutting edges, the purpose of which will later be explained. A driver's seat 23 is secured to the transverse bar 24 extending across the frame bars 13. A draft tongue 25 is secured to a transverse beam 26 extending across bolsters 15 and secured to the tops thereof, and a platform 14ª is secured to one of the sides of frame 14 on which an operator may stand to bag the sorted and picked potatoes.

The digger blade 27 is carried by and rigidly secured to the end of a swinging frame 28, which is pivotally secured to the forward end of the box-like frame 14 and is disposed directly behind and between the front wheels 19. The digger blade 27 has a concave cutting edge, the sides of frame 28 forming sides for the same. Elevating means for the swingable frame 28 are provided as follows:—

A pair of chains 29 are secured at one end adjacent the free ends of the sides of frame 28, pass over sheaves 30 and have their other ends secured to a pair of small drums or winches 31 secured to a transverse shaft 32 journaled in the spaced frame bars 13. The drums 31 are provided with ratchets 33, which are engageable with pawls 34 pivotally secured to a pair of operating levers 35, which are loosely mounted on shaft 32. The forward movement of these operating levers is limited by a cross beam 36 secured to the tops of frame bars 13. By alternately working the levers 35, the chain will obviously be wound on the drums 31, raising the end of the swingable frame 28 to a desired position. The pawls may be released from engagement with the ratchets 33 by means of a bell crank lever 37 controlled by an operating handle 38 disposed between levers 35 directly in front of the driver's seat. For the convenience of the driver, the levers 35 are extended and bent backwardly at their lower ends and inwardly to provide pedals 35ª by which the levers may be manipulated by the feet of the driver.

An endless conveyor 39 receives the potatoes from the digger blade 27 and elevates them to the sorting and picking apparatus mounted in the box-like frame 14. The conveyor is trained over a pair of sprockets 40 mounted on a transverse shaft 41, which is journaled in the intermediate portion of the swingable frame 28 and, at its upper end, is trained over the sprockets 42 mounted on the shaft 43 journaled in the sides of the box frame 14. A pair of idlers 44, mounted on the shaft 45, which also serves to pivot the swingable frame to the front end of box-like frame 14, engage the upper portion of the conveyor from underneath and keep the same in proper operative position to permit frame 28 to be swung. A second set of idlers 46, mounted on a transverse shaft journaled in the sides of frame 14 engage the conveyor from the underside at a point adjacent the sprockets 42. The conveyor employed comprises a pair of spaced endless chains 47 having secured thereacross a plurality of spaced slats 48. These slats may be secured in any suitable manner to the oppositely disposed inner sides of chains 47. These slats 48 pass over and contact with two sets of spaced rods 49 and 50, respectively, which rods are supported by and secured to upstanding lugs 51 carried by transverse supporting bars 52. The rods 49 are mounted on the swingable frame and extend beneath the conveyor from the sprockets 40 to the pivot shaft 45, the transverse supporting bars 52 being secured to the opposite sides of frame 28. The spaced rods 50 extend from the pivot shaft 45 to the sprockets 42 and are aligned with rods 49, their supporting bars 52 being secured at their ends to the sides of the box frame 14. The slats 48 are provided with a plurality of spaced depending fingers 53, adapted to project between the rods and rake the spaces therebetween, when the conveyor is in motion. The two sets of rods 49 and 50, being in alignment, the raking fingers will readily pass from the ends of rods 49 to the aligned rods 50. An agitating roller 54, preferably of corrugated construction, is journaled in the sides of the swingable frame 28, directly in front of the end of conveyor 39, and is driven in the direction of the motion of the carrier by means of an endless chain 55 trained over a sprocket 41ª on the outer end of shaft 41 and a sprocket 55ª on the outer end of the roller shaft.

The conveyor 39, as well as the picking, sorting and bagging apparatus, are driven from the back wheels 17. Relatively large sprockets 57 are mounted for rotation on sleeves keyed to the axle 18. One of these sprockets 57 is disposed adjacent each end of the axle 18 in close proximity to the inner sides of the wheels 17. A pair of ratchet disks 58 are secured for rotation with the axle, in any suitable manner, and are disposed on each of the sprockets 57, one of said disks being on each side of both sprockets. Spring pressed pawls 59 pivoted to the sides of sprockets 57 are adapted to engage the ratchet disks 58 and permit the sprockets 57 to be turned in the direction of the revolution of the wheels. Both of these sprockets 57 will thus be driven by the wheels 17, but in case one wheel moves faster than the other, the ratchet and pawl engagement will permit the faster moving wheel to turn without hindrance from the slower moving wheel. An efficient differential mechanism therefore has been effected by this structure.

A pair of endless chains 60ª are trained over the driving sprockets 57 and the sprockets 60 which are carried by the hubs 60ᵇ pivotally mounted at the outer sides of the frame 14 on the shaft 61 which constitutes the driving shaft for the cleaning, sorting, and bagging apparatus mounted within the box frame 14. The shaft 61 is journalled in a pair of shifter arms 62, secured to the working ends of shifting lever 63 which are rigidly secured to a shaft 63ᵃ journalled in the sides of frame 14. The shaft 61 is also journalled adjacent each end in a pair of blocks 65 slidable in aligned slots 64 in the sides of box frame 14. The shaft 61 obviously may be moved longitudinally of the frame 14 by the manipulation of shifting levers 63. The hubs 60ᵇ also carry a pair of sprockets 66 which are adapted to mesh with driving pinions 67 keyed to the driving shaft 43 for the conveyor 39. The shaft 43 at its outer ends carries small pinions 67ᵃ keyed thereto which are connected by endless chains 67ᵇ to a pair of pinions 61ᵃ keyed to the outer ends of the shaft 61 on the outer side of the hubs 60ᵇ. Thus it will be seen that the hubs 60ᵇ will be constantly driven from the back wheels 17 and will rotate about the shaft 61, and that when the shifting levers are pulled backwardly pinions 66 and 67 will be engaged thereby driving the shaft 43, which in turn drives the shaft 61 which is connected to drive the cleaning, sorting, and bagging apparatus. The driving power may thus be connected or disconnected from the working parts of the harvester by the manipulation of shifting levers 64. The levers 63 have outwardly hinged spring pressed upper portions adapted to engage small stop blocks 68 on the sides of the frame 14. Pinions 66 and 67, by means of the hinged shifting levers 63 may be quickly engaged and automatically locked in mesh by the stop blocks 68 when the levers 63 are grasped and pulled backwardly.

A steering shaft 69 is provided, suitably journaled in bearings secured to transverse beams extending across the tops of frame bars 13. The usual steering wheel 70 is rigidly secured to the rear end of shaft 69 directly in front of the driver's seat 23, and a beveled gear 71 is keyed to the front end of driving shaft 69 engaging a pair of aligned beveled gears 72, disposed at each side thereof and secured to the ends of a pair of longitudinally aligned shafts 73, extending at right angles to said driving shaft 69. The short shafts 73 are journaled in bearings 74 adjacent their ends, and carry the beveled gears 75 on their outer ends. The upper ends of pintles 21 on the wheel-holding forks 20 are supplied with beveled gears 76 engaging the last named beveled gears 75 at the outer ends of shafts 73. It will thus be seen that, when shaft 69 is turned by the steering wheel 70, the small shafts 73 will be turned in opposite directions, in turn, revolving the pintles 21 in the same direction, and thus properly steering the device.

*Operation.*

From the above description, the operation of the device is probably obvious, but may be briefly summarized as follows:—

The potato harvester is pulled by horses or a tractor and, as has been stated, the driving power is imparted from the rotation of the back wheels 17. The driving shaft 61 for the sorting and bagging apparatus (not shown) is always connected with the back wheels and the operator may apply the power to the conveyor 39 and the roller 54, by reaching down at his sides and pulling back the shifting levers 63 to engage the pinions 66 and 67. The digger blade may then be lowered, as desired, by pulling the operating handle 38 and adjusting the levers 35. The potatoes will be scooped up or dug by means of the blade 27, the cutting disks 22 having cut into the ground, at each side of and just ahead of the digger blade 27. The blade, therefore, is materially assisted by the disks 22 in digging the ground in which the potatoes are found. The concave shaped edge on blade 27 permits the blade to cut a wider swath in the ground and tends to draw the scooped up dirt towards the center thereof. The roller 54 receives the potatoes from the blade and tosses them over onto the lower end of the endless conveyor 39, and, in so doing, shakes out much of the dirt and small stones. On the conveyor, the potatoes are drawn along rods 49 and 50, the loose dirt, remaining small stones and part of the vines being permitted to drop through the spaced rods onto the ground. The depending fingers 53 on the slats 48 rake the spaces between the rods and keep these spaces cleared from dirt, vines or rocks. The potatoes are delivered over the upper end of conveyor 18 onto the conveyor of the sorting apparatus, indicated by the numeral 77, where they are freed from any remaining vines or dirt, sorted into sizes and bagged by an operator standing on the platform 14ᵃ. The operation of the cleaner, sorter and bagger apparatus is described and illustrated in the applicant's pending application, hitherto referred to.

The differential apparatus described permits the harvester to be turned or swung or backed without danger of stripping any of the gears of the working parts or twisting any of the shafts, although the driving power is connected to the working parts.

The swinging frame, controlled by the winches, permit the angle of the blade to be quickly and easily adjusted, and permit it to be elevated well out of contact with the ground, when so desired. The control levers and pedals for raising the digger blade permit the operator to adjust the blade with his feet while driving or operating the shifting levers 63.

The means for shifting the driving gears in and out of mesh provide a simple and efficient transmission mechanism conveniently located for the manipulation of the driver.

The construction of the frame, mounting of the front wheels and steering control therefor, are simple, efficient and durable.

From the above description, it is seen that the applicant has provided a simple and efficient device for digging the potatoes from the ground, separating the vines, stones and dirt therefrom, and then sorting and discharging the potatoes into bags, all of the working parts being driven from the rear wheels of the device, and all of these operations are continuously performed when the harvester is pulled over the ground.

It will, of course, be understood that various changes may be made in the form, details, arrangement and proportions of the parts without departing from the scope of applicant's invention.

What I claim is:—

1. In a potato harvester, the combination of a wheeled frame, means for digging potatoes from the ground mounted thereon, an endless conveyor receiving from said digging means and trained over sprockets mounted on a pair of transverse shafts, driving pinions on one of said shafts, a movable shaft mounted in said frame in alignment with said last mentioned shaft carrying pinions engageable with said driving pinions, a means for driving said movable shaft from the back wheels, and a means for moving said movable shaft to connect or disconnect the driving power with said endless conveyor.

2. In a potato harvester, the combination of a main wheeled frame, a digger frame pivoted thereto for vertical swinging movement longitudinally thereof, a digger blade at the free end of said swingable frame, a series of spaced rods rigidly disposed longitudinally of said swingable frame, and terminating at the upper end thereof, a series of similarly spaced rods rigidly disposed on said main frame and longitudinally alined with said first mentioned rods to form a substantially continuous carrier surface, and an endless conveyor having its upper end mounted on said main frame, and its lower end mounted across said digger frame to receive from said blade, and a plurality of depending means on said conveyor adapted to project between and rake said rods.

3. In a potato harvester, the combination of a main wheeled frame, a swingable frame pivoted thereto for swinging movement on a horizontal axis, potato digging means on the free end of said swingable frame, axially and horizontally alined sprockets adjacent the free end of said swingable frame, axially and horizontally alined driving sprockets mounted on said main frame, axially alined idler sprockets concentrically mounted with the pivot for said swingable frame, and an endless conveyor trained over said several sets of sprockets and adapted to receive from said digging means.

4. In a potato harvester, a frame supported at its rear end by wheels, wheel mountings swivelly connected to the forward end of said frame and adapted to be swung on substantially vertical axes, means for connecting said mountings to oscillate in unison, a front wheel journaled to each of said mountings, each of said wheels having a circular cutting edge disposed substantially in a vertical plane, said cutting edges in co-operation adapted to cut the ground at both sides of said frame, and a substantially flat digger scoop disposed behind and between said cutting edges having a width substantially equal to the distance between said cutting edges, said digger blade having upturned sides whereby the soil cut by said circular edges will be scooped up.

In testimony whereof I affix my signature.

CHARLIE JASPERSON.